United States Patent [19]
>
> Tomatis

[11] 4,327,252

[45] Apr. 27, 1982

[54] APPARATUS FOR CONDITIONING HEARING

[76] Inventor: Alfred A. A. Tomatis, 68, Boulevard de Courcelles, 75017 Paris, France

[21] Appl. No.: 141,648

[22] Filed: Apr. 18, 1980

[30] Foreign Application Priority Data

Feb. 8, 1980 [CA] Canada ............................ 345300

[51] Int. Cl.³ .................................................. H04R 3/00
[52] U.S. Cl. ........................................ 179/1 N; 73/585; 128/746
[58] Field of Search ............... 179/1 N, 1 R, 107 BC, 179/156 R; 35/35 C; 128/746; 73/585

[56] References Cited

U.S. PATENT DOCUMENTS

| | | | |
|---|---|---|---|
| 3,043,913 | 7/1962 | Tomatis | 179/1 N |
| 3,101,081 | 8/1963 | Tomatis | 179/1 N |
| 3,101,390 | 8/1963 | Maillè | 179/1 N |
| 4,021,611 | 5/1977 | Tomatis | 179/1 N |
| 4,212,119 | 7/1980 | Tomatis | 179/1 N |

*Primary Examiner*—Bernard Konick
*Assistant Examiner*—J. A. Popek

*Attorney, Agent, or Firm*—Wenderoth, Lind & Ponack

[57] ABSTRACT

Apparatus for conditioning the hearing of a patient is disclosed. A signal level detector establishes whether an incoming audio signal is above or below a threshold level to gate the audio signal to one or other of two parallel channels. The first channel has a frequency response curve in which high frequencies are suppressed and thus is the channel used when the audio signal is below the threshold. The other channel has a frequency response curve in which low frequencies are suppressed and this is the channel used when the audio signal exceeds the threshold. Two parallel output stages are provided, one including an electromechanical vibrator which is placed on the patient's skull and the other including earphones worn by the patient. A time delay module is also provided so that when switching from the one channel to the other channel occurs, the vibrator is switched to the other channel a predetermined time before the earphones which causes the conduction of vibrations through the patient's skull to precede the conduction of sound waves in air. This has the effect of preparing the patient for receipt of the air sound waves and can improve his speech.

20 Claims, 8 Drawing Figures

APPARATUS FOR CONDITIONING HEARING

BACKGROUND OF THE INVENTION

This invention relates to apparatus for conditioning the hearing of a patient in order to remedy speech problems.

U.S. Pat. No. 3,043,913, issued July 10, 1962 to Tomatis and U.S. Pat. No. 3,101,390 issued Aug. 20, 1963 to Maille disclose systems in which audio frequency signals derived from a patient's voice or another source are passed through two parallel filter channels to an output stage in the form of earphones. Each channel has a characteristic frequency response curve which can be adjusted manually as required. Typically, one channel has a frequency response curve representing the state of rest which is most desirable for the ear, this state of rest being obtained by suppressing high frequency components. The other channel has a frequency response curve in which low frequencies are suppressed. A signal level detector establishes whether the incoming signal is above or below an adjustable predetermined threshold level and a gating means is operable to pass the audio frequency signals through the one channel to the output stage if the threshold is not met and to pass the audio frequency signals through the other channel to the output stage if the threshold is exceeded.

Both patents describe beneficial effects which accrue from using this technique. Essentially, the patient's hearing is conditioned or trained by the use of the two different auditing states and this results in the improvement of many speech problems. This technique has now become well established as a practical tool of speech therapy.

Also recorded in the prior art, for example, U.S. Pat. No. 4,021,611 which issued on May 3, 1977 to Tomatis, is the use of electromechanical vibrators in audio conditioning apparatus. Such vibrators have long been known to assist a patient to hear by conducting vibration through the patient's skull and U.S. Pat. No. 1,969,559 which issued on Aug. 7, 1934 to Kelly discloses the combination of such "bone conduction" with the "air conduction" provided by an earphone.

Theoretical considerations upon which the present invention is based are discussed below.

By comparison to hearing which remains a passive act, listening is defined as an act in which volition plays a part. Listening means wanting to hear or apply oneself. It means placing the auditory apparatus into its maximum adaptive state to capture that which one wants to receive. It is essentially a matter of passing from sensation to perception.

In the most literal and figurative sense of the term it means to "turn one's ear". In order to accomplish this it is necessary to prepare the full complement of accessories which are annexed to the sensitive/sensory organ for the act: i.e. the cochleo-vestibular device, the musculature of the middle ear and the musculature of the outer ear. It is also necessary to organize a whole neurological structure depending on this dynamic function we call listening.

To do this implies:

(1) that the labyrinth, or the complete cochleo-vestibular area be voluntarily prepared (2) that this "precursory act" which precedes actual hearing be established in the following manner:

(a) by the tension of the hammer muscle (middle ear) which must adapt itself to the tension of the stirrup muscle which controls the action of the labyrinth (inner ear). And so, there is precession, i.e. a precursory act, of the stirrup tension with respect to the ensemble of elements that govern the function of the middle ear: hammer muscles, the muscles of the Eustachian tube, interplay of internal air pressures (b) by calling into play the entire nervous system so that the whole neurological tree i.e. medullar, pontic, cerebellum and extrapyramidal cortical areas might be available for this voluntary act carried out by the motor pyramidal "pathway" ("track").

Now, through this neurological interplay and through it alone, the cochleo-vestibular labyrinth governs the muscular tension of the body-static or stationary position dynamic (interaction)

the relative position of the limbs and their segments or, in other words, all posture and gesture.

Actually, the labyrinth conducts the functional and structural organization of the nervous system so that the act of speaking unfolds as a consequence of listening.

On the other hand, it is the role of the nervous system to cybernetically organize the ear's response so that it turns, adapts, prepares to listen or to put itself in a provisional state of readiness to capture, or in a state of cochleo-vestibular precession. The vestibular function is activated through bone conduction which, must precede air conduction or else the labyrinth will not be ready to hear.

SUMMARY OF THE INVENTION

Accordingly, the apparatus of the present invention provides two filter channels as in U.S. Pat. No. 3,043,913 but, in addition to the earphones a parallel output stage comprising a vibrator is provided. The apparatus includes time delay means which delays switching of the earphones to the "high" filter channel, an adjustable predetermined time after the vibrator has been switched to the "high" channel.

It has been found that the benefits achieved by the former systems are enhanced by providing the delayed air conduction essentially because the ear has been conditioned to hear or, more accurately, to listen by the preceding bone conduction. The actual delay period will vary from individual to individual but typically it would be in the range of 0–0.25 sec., adjustable in 15 millisec. intervals. These values are purely exemplary and the delay period may range up to 1 sec. on a continuously variable rather than a step-wise basis.

In a preferred embodiment of the invention, the bone conduction is also submitted to a time delay with respect to receipt of an input level higher than the threshold. Again, typically the delay period would be in the range 0–0.25 sec., adjustable in 15 millisec. intervals and again the range may extend up to 1 sec. on a continuously variable basis. In the case where there is a bone conduction delay, the air conduction time delay period begins at the end of the bone conduction delay period. The actual delay to bone conduction chose will depend on the language being used as different languages each exhibit a different inherent delay between the rest condition and the onset of audible sound such as at the beginning of a word or syllable.

DESCRIPTION OF THE PREFERRED EMBODIMENT

Figure 1:
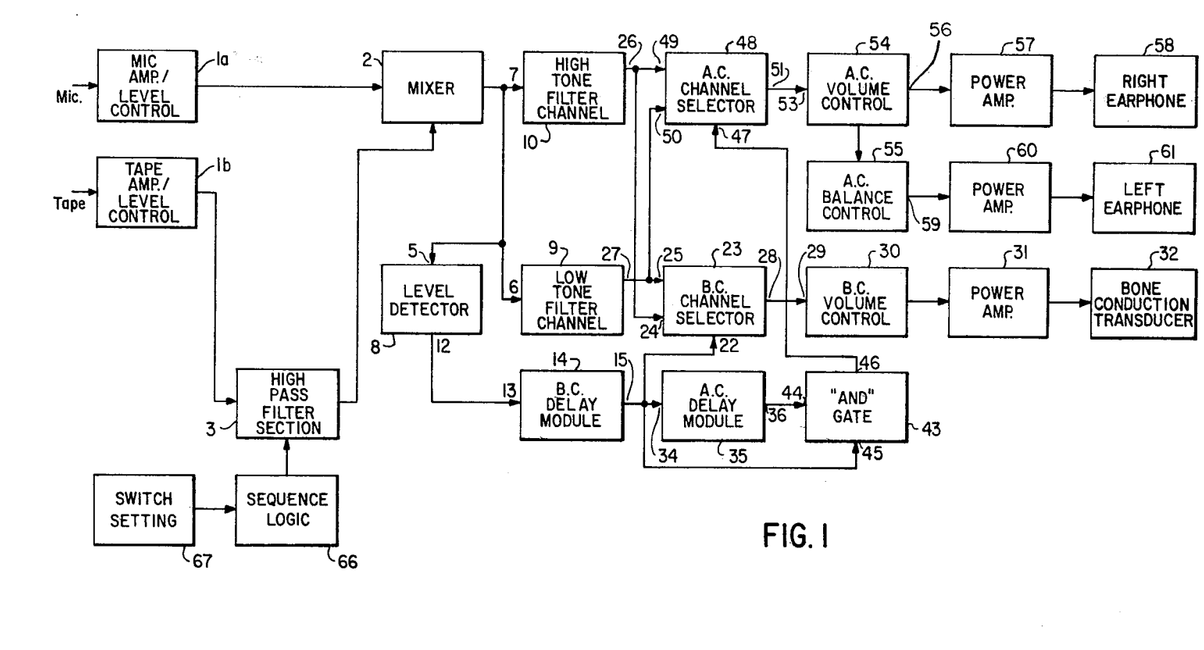
FIG. 1 is a block diagram illustrating an acoustic signal processing apparatus according to the invention.
Figure 2:
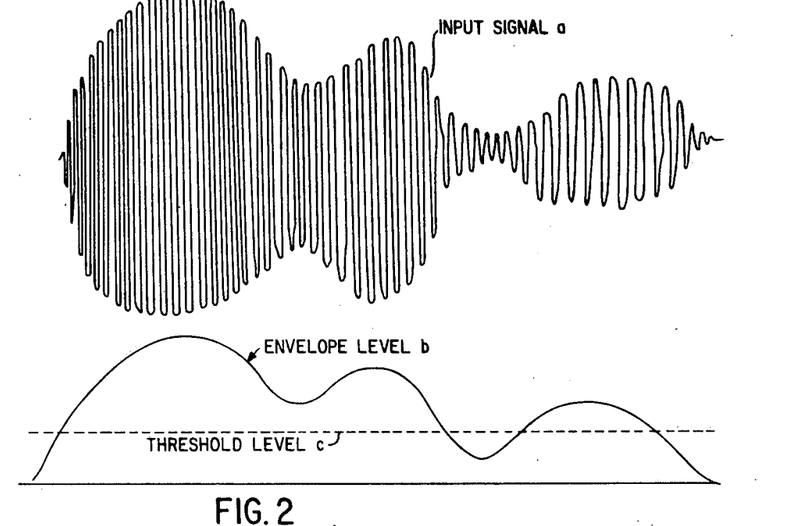
FIG. 2 represents graphically a typical input signal to the apparatus together with the envelope intensity level of that signal.

Referring firstly to FIG. 1, parallel input sections 1a,1b, supplied respectively, from a microphone (not shown) or a magnetic tape player (not shown) comprise circuitry for amplifying and adjusting the level or volume of the incoming electrical signal. The output of input section 1a is connected directly to a mixer 2 but the output of input section 1b is connected to mixer 2 via a high pass filter section 3. An audio frequency signal is obtained at the output of mixer 2 and FIG. 2 shows a typical audio frequency signal a obtained.

Figure 3:
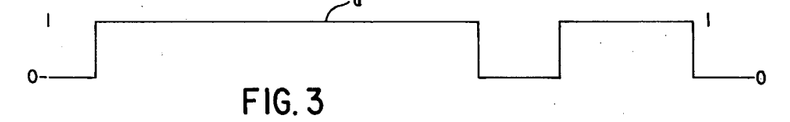
FIG. 3 represents graphically the output of a threshold level detector of FIG. 1 in response to the input signal of FIG. 2.

The output of mixer 2 is connected in parallel to inputs 5,6 and 7 of an envelope level detector 8, a "low" filter channel 9 and a "high" filter channel 10, respectively. The level detector 8 determines when the envelope level b derived from signal a exceeds a predetermined threshold level c (shown in FIG. 2) and provides an output signal d (FIG. 3) which is at a logic "1" while the threshold c is exceeded by envelope signal b and a logic "0" when the threshold c is not exceeded. The threshold level is set above ambient noise level so that the presence of a logic "1" in signal d would signify the occurrence of a proper input signal a such as when someone speaks into the microphone.

The output 12 of level detector 8 is connected to the input 13 of a first time delay module 14 which establishes a time delay between the sensing by the level detector 8 of a change from below threshold to above threshold c (i.e. a switch from logic "0" to logic "1") and conduction of an acoustic signal through a patient's skull, known as bone conduction, and again when the level goes from high to low. The first time delay module 14 may, therefore, be referred to as the bone conduction delay module. The time delay is adjustable, preferably in 15 millisecond intervals up to 0.25 sec.

Figure 4:
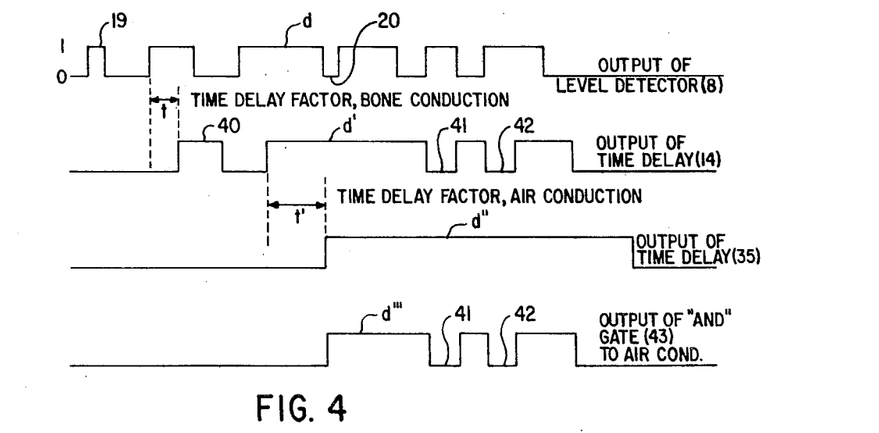
FIG. 4 represents graphically the processing of the output signal from the threshold level detector.

The signal d is, therefore, delayed by up to 0.25 secs. and this delayed signal is present at output 15 of module 14. It should be noted that the delay time starts as soon as signal d is received at input 13 and this signal d will be provided at output 15 only if the input signal has been stable during the delay period. If during the delay period, signal d changes from 0 to 1 or vice versa the time delay is reset. Thus, changes which last less than the delay time are filtered out. FIG. 4 gives an illustration of this. In FIG. 4 the top trace represents a typical output signal d of level detector 8. The next trace d' represents the signal d after it has been time delayed by a predetermined amount. It can be seen clearly that the changes in signal d which last for less than the time delay t are disregarded and omitted in signal d'. Portions 19 and 20 of signal d represent disregarded changes.

The output 15 of module 14 is connected to a control input 22 of channel selector 23 which determines whether the "high" or the "low" filter channel is selected. To this end, the channel selector 23 has a high input or logic "1" input 24 and a low or logic "0" input 25 connected, respectively, to the output 26 of the "high" filter channel 10 and the output 27 of the "low" filter channel 9. The channel selector 23 operates under control of the signal d' appearing at its control input. When a logic "0", i.e. the signal is less than the preset threshold level, is present at control input 22, the selector 23 causes the signal at input 25 to appear at output 28 of the channel selector. Thus, the "low" filter channel 9 is selected and low frequency components of signal a appear at output 28. When a logic "1", i.e. the signal is greater than the threshold level, is present at control input 22, the "high" filter channel 10 is selected and high frequency components of the signal a are derived at output 28.

Output 28 is connected to the input 29 of a level or volume control 30 which feeds a bone conduction power amplifier 31 and which in turn supplies a transducer labelled generally 32. The transducer, typically, is an electro-mechanical vibrator which would be attached to the patient's forehead and cause conduction of the vibrations resulting from signal a from the forehead through the skull to the bones of the inner ear.

The output 15 of delay module 14 is also connected to the input 34 of a second delay module 35, which will be referred to as the air conduction delay module for reasons which will become apparent from the following description. The air conduction delay module 35 is similar or identical to bone conduction delay module 14 and again the time delay is selectable in 15 millisecond intervals up to 0.25 sec. Signal d' is applied to the input 34 of module 35 and after the further time delay a signal d" (see FIG. 4) is obtained at output 36 of module 35. As with the bone conduction delay module 14 if a change in level of the input signal (d' in this case) does not remain for longer than the predetermined time delay (t' in this case) the change will not register in the output signal d". In other words, some of the bone conduction transitions are omitted in signal d" if the air conduction delay is greater than the bone conduction delay. Portions 40, 41 and 42 are examples of such short duration transitions.

This would have the undesirable effect of making it possible to have air conduction in the "high" channel while bone conduction is in the "low" channel and to avoid this an AND gate 43 is provided. Input 44 of the AND gate is connected to output 36 of air conduction delay module 35 and input 45 is connected to the output 15 of bone conduction delay module 14. When signals d' and d" are applied, respectively, to inputs 45 and 44 an output signal d''' (see FIG. 4) is obtained at output 46 of AND gate 43. It will be noticed that the effect of the AND gate is to restore transitions from logic '1' to logic '0' such as portions 41 and 42.

The output 46 of AND gate 43 is connected to a control input 47 of a further channel selector 48 which determines whether the "high" or "low" filter channel is selected for air conduction. Selector 48 has a logic '1' input 49 connected to output 26 of the "high" filter channel 10 and a logic '0' input 50 connected to the output 27 of the "low" filter channel 9. Channel selector 48 operates in the same manner as channel selector 23 so that when signal d''' is at logic '1', the selector causes the signal at input 49 to appear at output 51 of selector 48 and high frequency components of signal a appear at output 51. When the signal d''' is at logic '0', selector 48 causes low frequency components to signal a to pass from input 50 to output 51.

Output 51 is connected to input 53 of a volume control 54 and balance control 55. Output 56 of volume control 54 is connected through a power amplifier 57 to a right earphone 58 of a headset and output 59 of balance control 55 is connected through a power amplifier 60 to a left earphone 61 of the headset. The headset derives sound in the patient's ears resulting from the signal a and this sound is conducted to the inner ear by air in the ear canal, hence the expression "air conduction".

High pass filter section 3 comprises a group of different high pass filters, e.g. a 1 KHz high pass filter, a 2 KHz high pass filter—up to a 8 KHz high pass filter. High pass filter section 3 is under control of a sequence logic section 66 which scans through the group of filters according to a desired sequence which can be set by a group of switches referenced 67.

The apparatus described above operates as follows. A tape of the subject's voice is played on the tape player and, depending on the setting of switches 67, the filters in section 3 are scanned according to a predetermined sequence. Thus, for example, the 8 KHz high pass filter may be activated initially for a period of 5 minutes after which this is replaced with the 7 KHz high pass filter for 5 minutes and so on and in this way a series of filtered signals a appear at the output of mixer 2. The subject may be instructed to interact with the signals derived from the tape by speaking into the microphone at certain times and unfiltered signals a are, therefore, also obtained from the microphone.

At the onset of a spoken word either from the tape player or the microphone causing an input signal a to appear at the output of mixer 3, level detector 8 detects an envelope level greater than the preset value and, after a time delay preset in module 14, channel selector 23 causes a switch over from "low" channel 9 to "high" channel 10 resulting in high frequency components of signal a being applied to the bone conduction amplifier and transducer 30. Meanwhile low frequency components of signal 'a' are being fed through selector 48 to AC volume control 54. After a further time delay as preset in module 35 channel selector 48 causes a switch over from "low" channel 9 to "high" channel 10 resulting in high frequency components of signal a appearing at AC volume control 54. Thus, air conduction of the high frequency components of signal a is delayed with respect to bone conduction of the same high frequency components.

When the envelope level drops off as at the end of a syllable or word, signals d' and d''' drop to logic '0' simultaneously (portions 41 and 42) and so selectors 23 and 48 switch simultaneously to permit the low frequency components of signal a to bone conduction volume control 30 and to the AC volume control 54. However, this simultaneous switching of bone conduction and air conduction at the end of a syllable will only occur if the time between syllables is less than the time delay provided by air conduction module 35.

Reference will now be made to FIGS. 5A–5D which show typical components forming the various modules and blocks shown in FIG. 1.

Figure 5A:
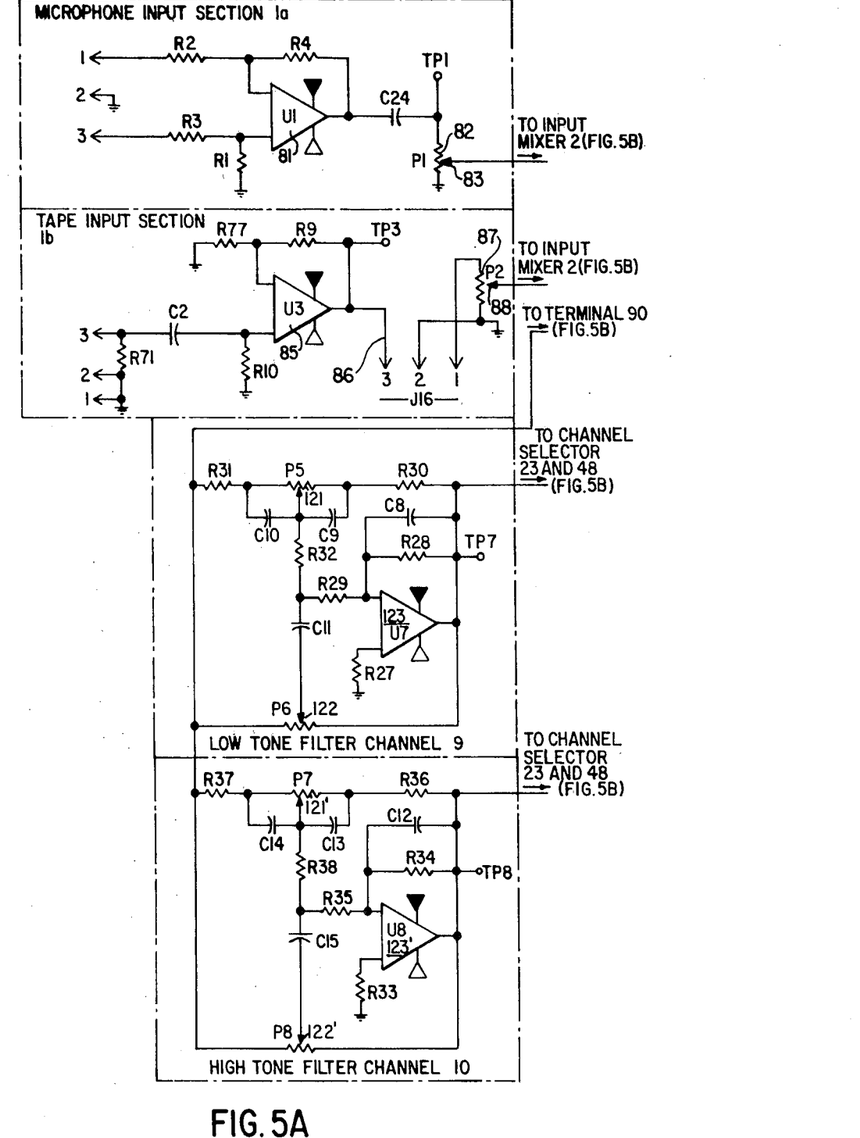
FIGS. 5A–5D are schematic diagram showing in greater detail the components represented by the blocks in FIG. 1.
Figure 5B:
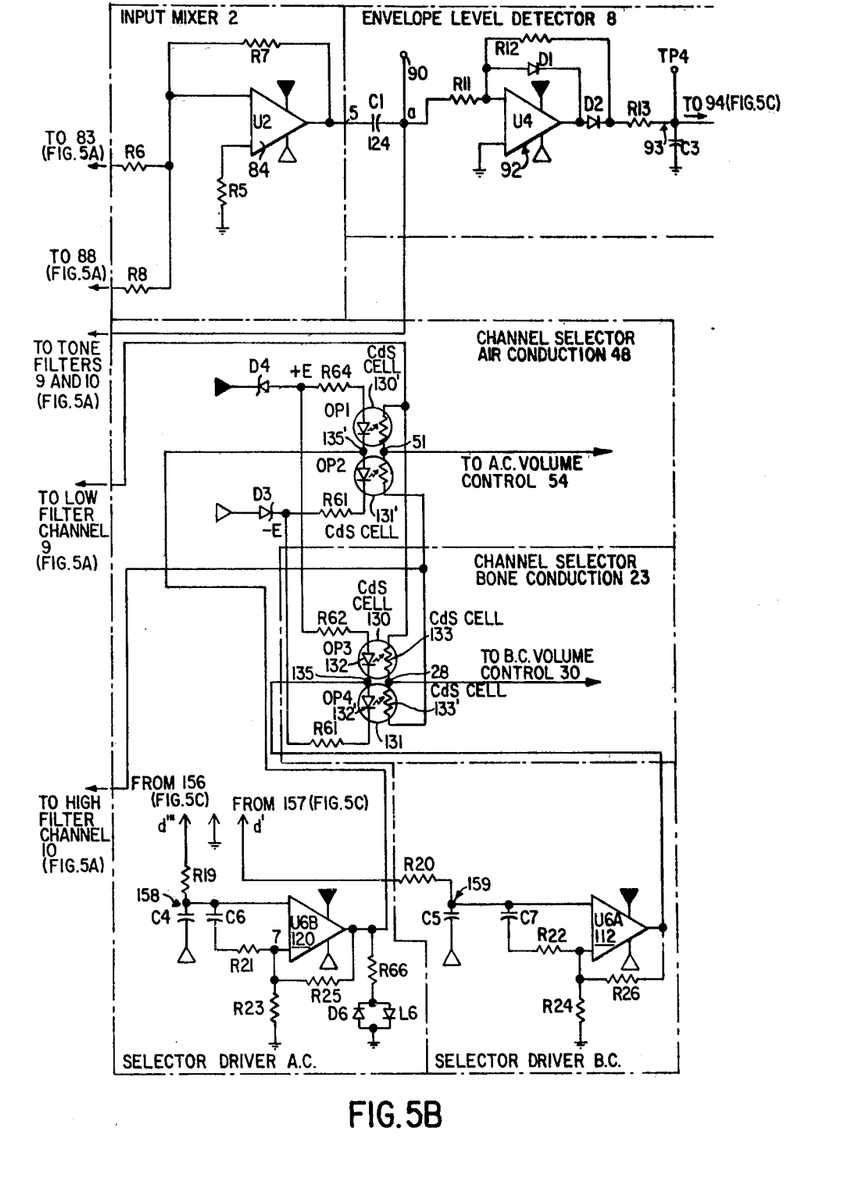
Figures 5C, 5D:
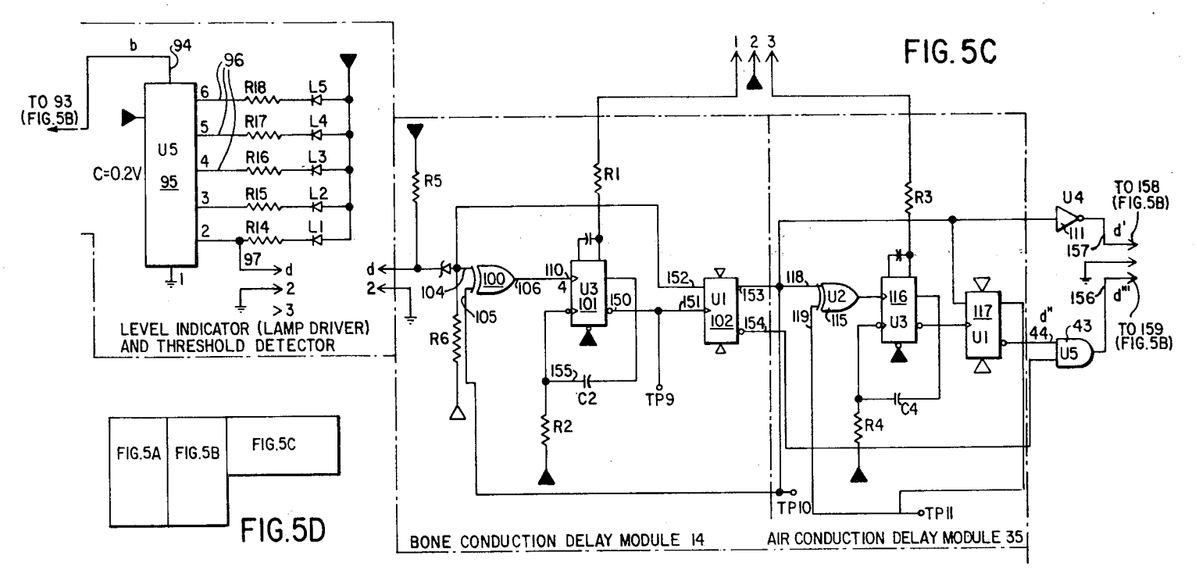

The vast majority of resistors and capacitors shown in FIG. 5 will not be described specifically as their function and operation should be readily apparent to those skilled in the art. Microphone input section 1a comprises a preamplifier 81 connected to a level control 82 having an output terminal 83 connected to the mixer which is formed as an amplifier 84.

Tape input section 1b also comprises a preamplifier 85 supplying via terminal 86 high pass filter section 3 (not shown in FIG. 5). A level control 87 is connected to the output of the high pass filter section and an output terminal 88 is connected in common with terminal 83 to amplifier 84.

Envelope detector 8 has its input 5 connected to the output of mixer 2 and the audio frequency incoming signal a appears at terminal 90. Rectifying stage 92 rectifies the signal and the resistor/capacitor network 93 filters out the audio components leaving the envelope signal b which is applied to input 94 of comparator/level indicator 95 which contains 5 voltage comparators and lamp(LED) drivers.

Each comparator tests the input level to a reference level c, these being five equal steps from 0 to 1 volt, that is, comparator #1 will determine if the input is greater than 0.2 volts while comparator #2 tests against 0.4 volts and so on such that when the input level exceeds 1.0 volts, all 5 comparators will turn their respective L.E.D.'s L1 to L5 on via resistor/L.E.D. lines 96. This device thus gives a solid state indication of the signal level. The output 97 of comparator #1 (0.2 volts) is also used as the threshold level detector for the timing delays. When the threshold is exceeded, signal d appearing at output 97 goes low. That is, when the comparator senses a level of input greater than the threshold, it outputs a logical 0 signal which for the purpose of description, is considered the true state which for the purpose of description, is considered the true state for signal d.

The logical signal d is fed to the delay module 14 which comprises an Exclusive OR gate (XOR) 100, a timer chip 101 and a flip/flop 102. The module is such that after a given time delay, the state of the output line will be equal to the state of the input line, that is, a true input causes a true output. Note that a logical 0 is a true for the input signal d while a true output is a logical 1; this is done with the inverter 111. XOR gate 100 has an input 104 connected to receive signal d and an input 105 connected to the noninverting output 153 of flip-flop 102 such that when inputs 104 and 105 are the same, the XOR output 106 is 0, and changes to a 1 when input d is not the same as the output 153.

Assuming that we have been stable at a below threshold signal level for a long time, and the signal level suddenly increases to cause d to change to a logical 0, which represents an envelope level greater than the threshold, a logical 1 is generated by the XOR gate at 106 (this indicates that the input is not equal to the output). This change in 106 from a 0 to a 1 at the timer chip input 110 starts a timing delay for a preset factor, during this time the timer output 150 goes from a 1 to a 0. At the end of the time delay, output 150 returns to a 1 state and causes flip-flop 102 to transfer the logic level at its data input 152 to its output 153. This makes both inputs of the XOR gate 0 and thus output 106 returns to a 0 state. This now allows the delay module to look for a "1" at input 104, and another timing delay will start, changing input 105 (or 153) to be the same as input 104.

As can be seen the module changes the output to be equal to the input after a fixed time delay.

The timer chip 101 also has a feed-back loop 155 which causes it to oscillate at the timing delay period to insure that immediately after power up, the output will be made equal to the input. Since the timer is a retriggerable type, the input change at input 110 will override the feed-back loop 155 and thus this loop is transparent to the normal operation.

The output of the flip-flop 153 is inverted by inverter 111 to give signal d' at output 157 and fed to the selector module. The inverter corrects for the fact that the signal d was inverted by the output 97 of the comparator.

The air conduction time delay module 35 is similar to module 14 having XOR gate 115, timer 116, flip-flop 117. Inputs 118 and 119 of XOR gate 115 are connected, respectively, to the non-inverting output 153 of flip-flop 102 and the non-inverting output of flip-flop 117. Operation is identical to that of module 14 except that instead of the true output of the flip-flop 117 the inverted output is used, this is to correct for the inverted state of d, before the signals are fed to the AND 43 gate to create the control signal for air conduction signal d''' at output 156.

Output 157 is connected through a selector driver comprising a resistor/capacitor network 159 and an amplifier 112 to B.C. channel selector 23 and output 156 is connected through a similar selector driver comprising a resistor/capacitor network 158 and amplifier 120 to A.C. channel selector 48.

Low filter channel 9 comprises a resistor/capacitor network including variable resistors 121 and 122 which can be adjusted to obtain a desired frequency response over the audio frequency spectrum and an amplifier 123 is provided to amplify the selected frequencies. Typically, the resistors are adjusted to obtain a frequency response curve in which low frequencies are passed in various degrees of amplification and high frequencies are blocked.

High filter channel 10 comprises the same components denoted by a prime notation and, in this case, the resistors are adjusted to obtain a frequency response curve in which high frequencies are passed in various degrees of amplification and low frequencies are blocked.

Signal a is applied to both filter channels from amplifier 84 of the mixer stage 2 through isolation capacitor 124.

Channel selector 23 comprises two optical couplers 130 and 131 each comprising an L.E.D. (light emitting diode) 132,132' and CdS (Cadium Sulphide) cell 133,133'. Cell 133 is connected to the output of low channel filter 9 at amplifier 123 and cell 133' is connected to amplifier 123' of high channel filter 10. Cells 133 and 133' are interconnected at a point representing the output 28 of the channel selector 23.

The L.E.D.'s 132 and 132' are connected at a junction 135 and this junction is connected to the bone drive output of amplifier 112. The LED's are connected in series between two reference voltages +E and −E and when a logic '0' is present on signal d' a negative bone drive signal is applied to junction 135 effectively blocking out LED 132'. Current passing through LED 132 causes a significant drop in the resistance of cell 133 causing the signal from low filter channel 9 to pass to junction 28. Thus the channel selector selects the signal emanating from the low filter channel 9.

When signal d' switches to logic '1' a positive bone drive signal is obtained at amplifier 112 which is slew rate limited by the resistor capacitor network 159 and as this positive going signal builds up current through LED 132' increases as the current through LED 132 decreases resulting in a gradual increase of the resistance of cell 133' and a gradual increase of the resistance of cell 133 and, consequently, in a smooth transition from low channel to high channel. When the transition is complete the signal from the high filter channel 10 passes completely to junction 28.

Channel selector 48 is configured in exactly the same manner as channel selector 23 but, of course, instead of being powered by the bone conduction drive, it is powered by the air conduction drive which, of course, is delayed with respect to the bone conduction drive.

While the invention has been described in a specific embodiment, it is not intended to be limited thereby but rather it is intended to cover the invention within the spirit and scope of the appended claims.

What is claimed is:

1. Apparatus for conditioning the hearing of a patient comprising an input stage providing audio frequency electrical signals derived from acoustic signals, means connected to an output of the input stage for determining the envelope level of the audio frequency electrical signals, means for comparing the envelope level with a predetermined threshold level and deriving a first logic signal when the envelope level is below the predetermined threshold level and a second logic signal when the envelope level is above the predetermined threshold level, two channels connected in parallel to the output of the input stage, the first channel containing first filter means defining a first response curve over the audio frequency spectrum and the second channel containing second filter means defining a second response curve over the audio frequency spectrum, first channel selector means connected between, the two channels and, a first output stage, the first output stage comprising an electromechanical vibrator for applying vibrations to the patient's skull, the first channel selector means being operable under control of the envelope level comparing means to connect a predetermined one of the two channels to the first output stage when the first logic signal is derived and to connect the other channel to the first output stage when the second logic signal is derived, second channel selector means connected between, the two channels and, on the other hand, a second output stage, the second output stage comprising speaker means for applying acoustic air waves to the patient's ear, first time delay means connected to receive an output of the envelope level comparing means thereby to derive from the logic signals applied to the first channel selector means delayed logic signals which are time delayed by a predetermined amount with respect to the logic signals applied to the first channel selector means, the second channel selector means being operable under control of the first time delay means to connect the predetermined one of the two channels to the second output stage when the delayed first logic condition is obtained and to connect the other channel to the second output stage when the delayed second logic condition is obtained.

2. Apparatus according to claim 1, including a further time delay means having an input connected to the output of the envelope level comparing means thereby to introduce a predetermined time delay to the logic signals derived by the envelope level comparing means, the further time delay means having an output connected both to a control input of the first channel selector means and to an input of the first time delay means.

3. Apparatus according to claim 1 or 2 including manual adjusting means on the first time delay means for adjusting the predetermined time delay of the first time delay means.

4. Apparatus according to claim 2 including manual adjusting means on the further time delay means for adjusting the predetermined time delay of the further time delay means.

5. Apparatus according to claim 2 including AND gating means connected between the further time delay means and the second channel selector means and having a first input connected to an output of the first time delay means and a second input connected to the output of the further time delay means and an output connected to a control input of the second channel selector means.

6. Apparatus according to claim 5 including manual adjusting means on the first time delay means for adjusting the predetermined time delay of the first time delay means.

7. Apparatus according to claim 6 including manual adjusting means on the further time delay means for adjusting the predetermined time delay of the further time delay means.

8. Apparatus according to claim 2, wherein the further time delay means ignores changes in the logic signals applied thereto if those changes last less than the predetermined time delay set in the further time delay means.

9. Apparatus according to claim 8, including AND gating means connected between the further time delay means and the second channel selector means and having a first input connected to an output of the first time delay means and a second input connected to the output of the further time delay means and an output connected to a control input of the second channel selector means.

10. Apparatus according to claim 2, wherein the first channel selector means and the second channel selector means each phases in gradually whichever channel has been newly selected and phases out gradually the other channel.

11. Apparatus according to claim 1 or 2 in which the first time delay means provides a time delay of up to 1.00 second.

12. Apparatus according to claim 1 or 2 in which the first time delay means provides a time delay of up to 1.00 second and includes manual adjusting means to set the predetermined time delay.

13. Apparatus according to claim 1 in which the input stage comprises an input section for connection to a tape player output and a high pass filter section comprising a plurality of different value high pass filters, the input section having an output connected to an input of the high pass filter section, the apparatus further comprising scanning means connected to the high pass filter section to activate according to a desired sequence and for desired periods of time different ones of the high pass filters.

14. Apparatus according to claim 13 in which the high pass filters have pass frequencies which are graduated in a predetermined range and the scanning means is arranged to scan along the range.

15. Apparatus according to claim 14, wherein the further time delay means ignores changes in the logic signals applied thereto if those changes last less than the predetermined time delay set in the further time delay means.

16. Apparatus according to claim 1 in which the input stage comprises a first input section for connection to a microphone output and a second input section for connection to a tape player output, the first and second input sections both having outputs connected with inputs of a mixer which has an output serving as the output of the input stage.

17. Apparatus according to claim 16 in which a high pass filter section is connected between the output of the second input section and the respective input of the mixer, the high pass filter section comprising a plurality of different value high pass filters, the apparatus further comprising scanning means connected to the high pass filter section to activate according to a desired sequence and for desired periods of time different ones of the high pass filters.

18. Apparatus according to claim 17, in which the high pass filters have pass frequencies which are graduated in a predetermined range and the scanning means is arranged to scan along the range.

19. Apparatus according to claim 1 wherein the first time delay means ignores changes in the logic signals applied thereto if those changes last less than the predetermined time delay set in the first time delay means.

20. Apparatus according to claim 1, wherein the first channel selector means and the second channel selector means each phases in gradually whichever channel has been newly selected and phases out gradually the other channel.

* * * * *